C. FREBORG.
MOTOR FOR PLAYER PIANOS.
APPLICATION FILED JAN. 7, 1914.

1,267,535.

Patented May 28, 1918.
5 SHEETS—SHEET 1.

Witnesses:
Inventor:
Charles Freborg
Sheridan, Wilkinson & Scott Attys

C. FREBORG.
MOTOR FOR PLAYER PIANOS.
APPLICATION FILED JAN. 7, 1914.
1,267,535.
Patented May 28, 1918.
5 SHEETS—SHEET 2.
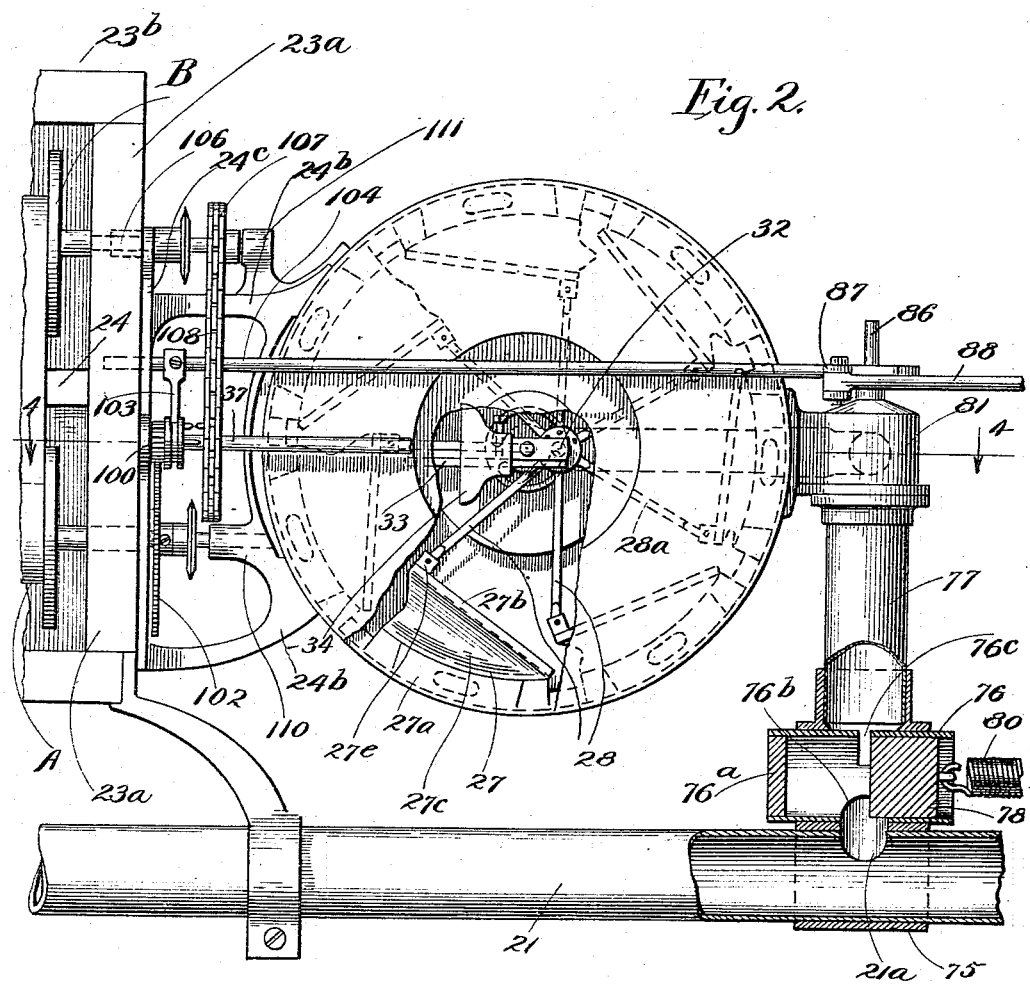
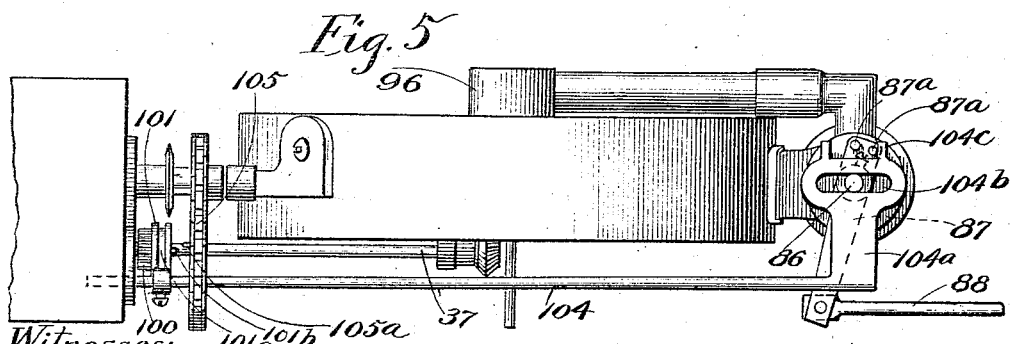

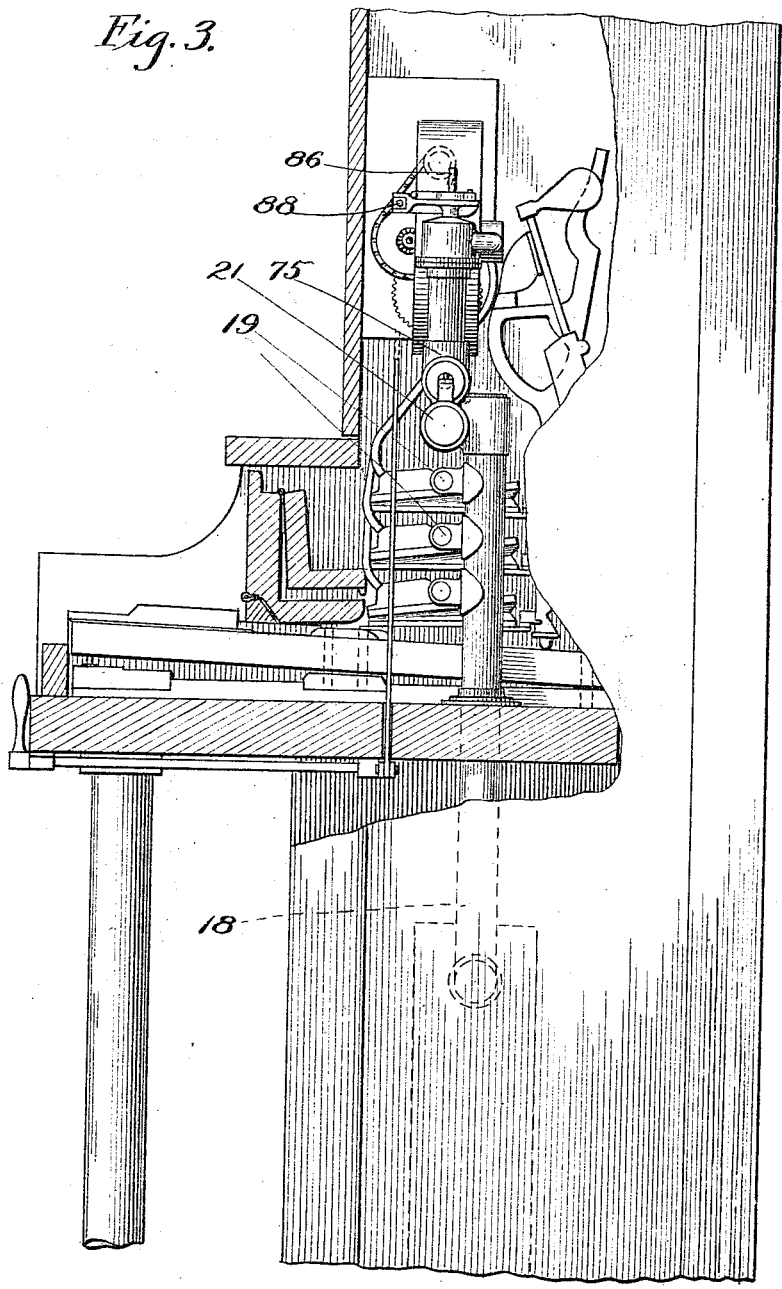

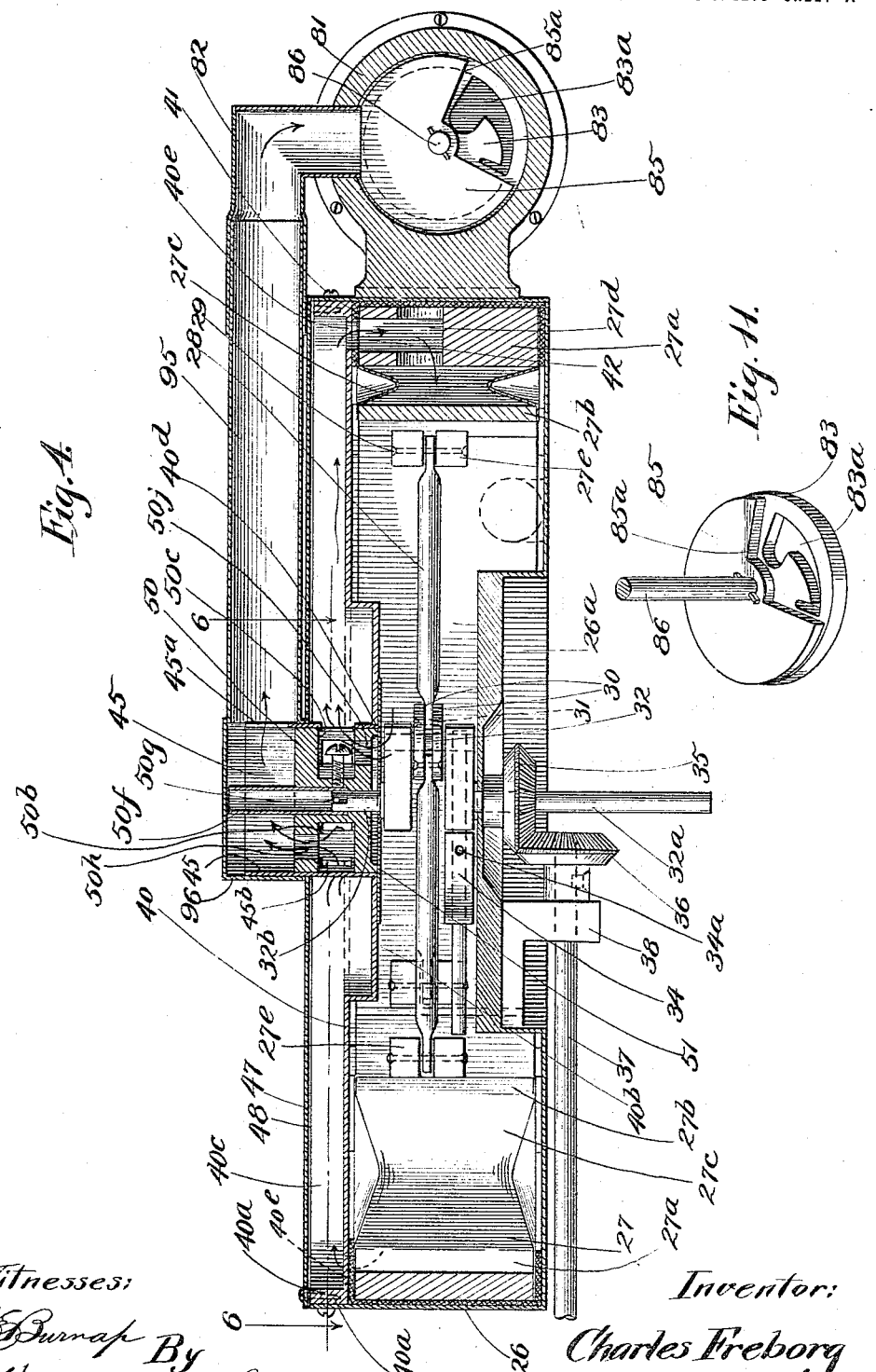

C. FREBORG.
MOTOR FOR PLAYER PIANOS.
APPLICATION FILED JAN. 7, 1914.
1,267,535.
Patented May 28, 1918.
5 SHEETS—SHEET 5.
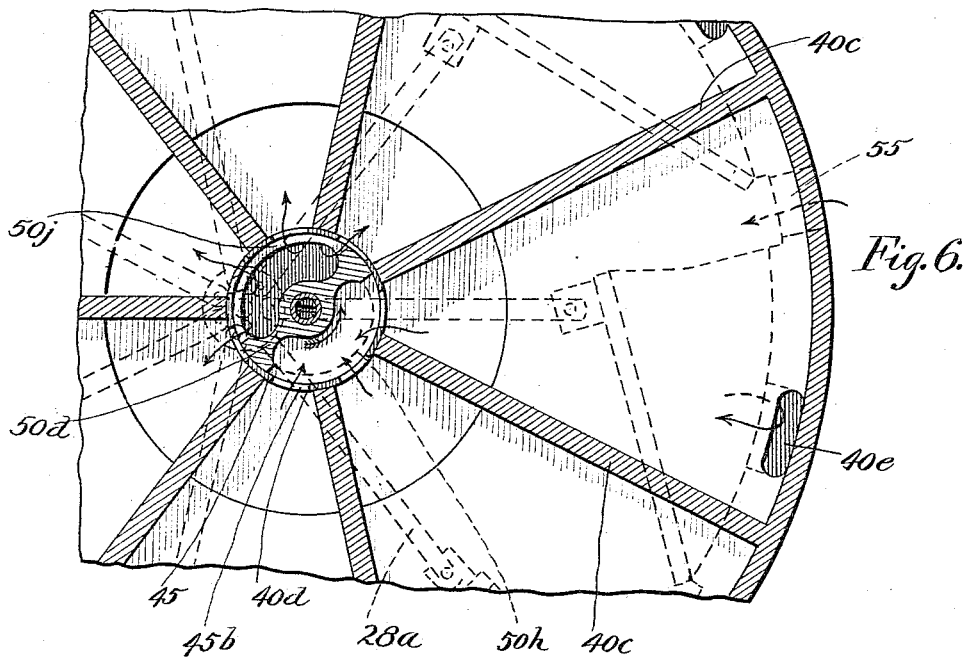
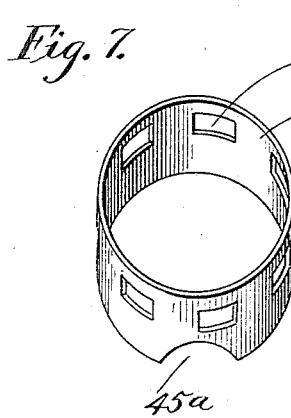
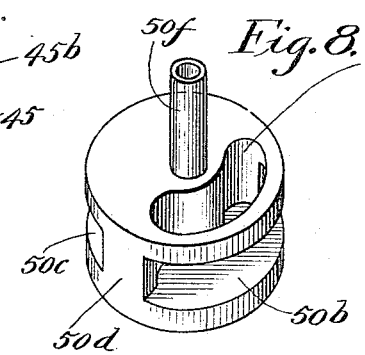
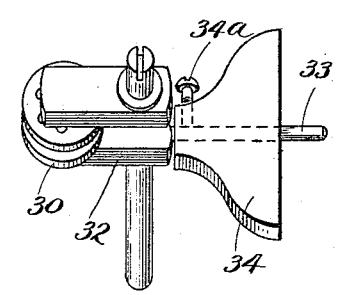
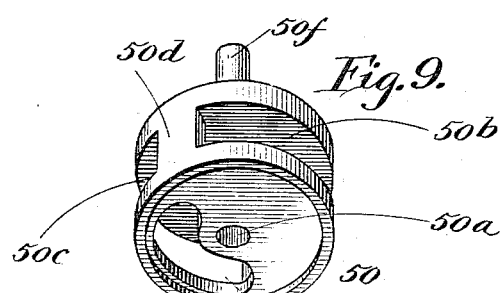
Witnesses:
C. C. Burnap
Henry A. Parks
Inventor:
Charles Freborg
By Sheridan, Wilkinson & Scott, Attys

UNITED STATES PATENT OFFICE.

CHARLES FREBORG, OF KANKAKEE, ILLINOIS.

MOTOR FOR PLAYER-PIANOS.

1,267,535.  Specification of Letters Patent.  Patented May 28, 1918.

Application filed January 7, 1914. Serial No. 810,873.

*To all whom it may concern:*

Be it known that I, CHARLES FREBORG, a citizen of the United States, residing at Kankakee, in the county of Kankakee and State of Illinois, have invented certain new and useful Improvements in Motors for Player-Pianos, of which the following is a specification.

This invention relates to improvements in player pianos and motors therefor, and has for its principal object to provide an improved form of motor and controlling means especially adapted for use for driving the music reels in connection with a player piano or piano player.

Hitherto it has been customary in providing driving means for the music reels to provide a plurality of bellows arranged side by side and operating to rotate a shaft. In my invention I provide an improved form of motor in which a plurality of operating units are circumferentially arranged about a shaft which is rotated thereby providing, in effect, a rotary motor in which the plurality of successive impulses for each rotation of the shaft is so great as to provide substantially smooth driving as opposed to the comparatively periodic or jerky rotation of the present day arrangements. So far as I am aware, this arrangement is new when operating on a negative pressure or partial vacuum which is utilized in connection with such player actions.

Still another object is to provide a controlling valve in combination with the motor which will permit controlling of the speed thereof and I also provide, in connection with this valve, means to operate the same, said means being also arranged to throw the motor from driving to rerolling action, as will be fully described.

Still another object is the construction and arrangement of the motor supporting structure which is designed to transmit the negative pressure or partial vacuum to the motor as well as to support the player mechanism.

Still another object is to provide means for automatically regulating the pressure transmitted to the motor from the bellows or similar mechanism so as to automatically maintain the speed of the motor constant for any adjustment of the controlling valve.

Other objects will be set forth and made apparent in the following specification and accompanying drawings, in which:

Fig. 2 is a front elevation on an enlarged scale showing the motor and reel driving mechanism, a portion of the former being broken away and showing in detail the automatic pressure regulator;

Fig. 3 shows a vertical transverse section through a portion of a player piano showing my invention applied thereto;

Fig. 4 is a horizontal section along the line 4—4 of Fig. 2;

Fig. 5 is a plan view showing the exterior of the motor and driving mechanism together with a portion of the valve controlling mechanism;

Fig. 6 is a detail section of a portion of the motor taken along the line 6—6 of Fig. 4;

Fig. 7 is a detail perspective of the apertured sleeve of the motor distributing valve;

Fig. 8 is a similar view of the valve itself;

Fig. 9 is a perspective showing the opposite face of the valve;

Fig. 10 is a perspective of the crank shaft;

Fig. 11 is a perspective of the controlling valve.

Like numerals refer to like elements throughout the drawings, in which;

Figure 1:
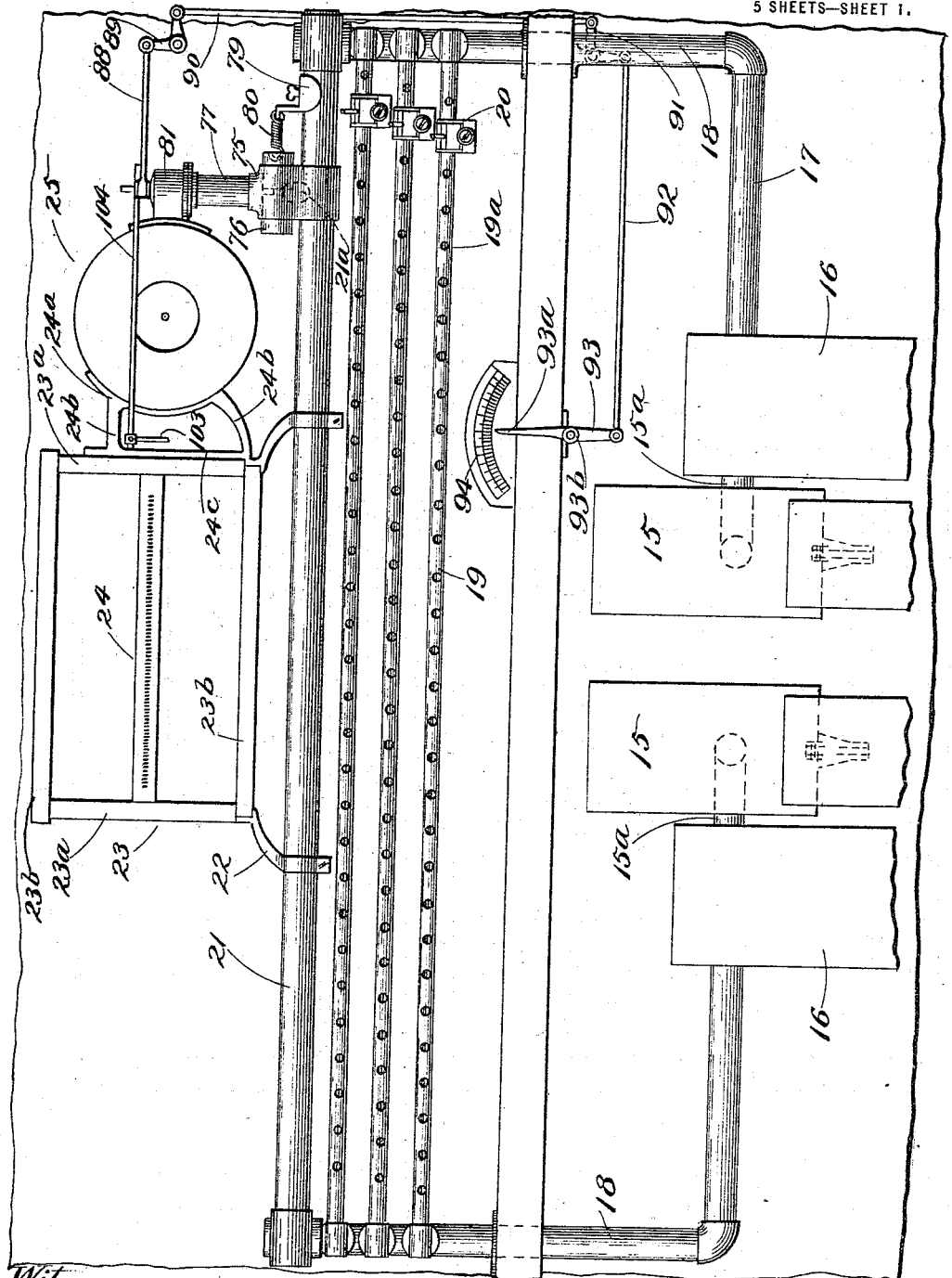
Figure 1 is a front elevation of the player mechanism showing the motor and the vacuum line.

15 designates a conventional form of vacuum producing apparatus such as foot operated bellows or the like and being preferably a pair of the same, which communicate with vacuum boxes or chamber 16 through tubes 15ª in such wise as to maintain a constant partial vacuum or negative pressure in the boxes 16. From the latter lead the ducts or tubes 17 communicating with the upwardly extending tubes 18 at each side of the player. Smaller tubes 19 extend across between the tubes 18 and are in communication therewith. These tubes 19 are apertured, as indicated by numerals 19ª and actuating pneumatics 20 are adjustably mounted thereon and communicate therewith, as is described in a co-pending application. This structure does not form a part of my present invention and is merely described and shown for completeness.

Upwardly of the tubes 19 and extending across and communicating with the tubes 18, is the conduit 21 providing a negative pressure tube or conduit, as will be apparent. It is also to be noted that owing to this cross communication between the tubes 18 and consequently between the vacuum boxes 16, when unequal pressures obtain in the latter, these pressures will be substantially equalized in the tube 21, thereby serving to provide a substantially uniform negative pressure therein. Brackets or arms 22 are clamped upon or otherwise secured to the tube 21 which is comparatively rigid in construction, and these brackets serve to support the roll chamber structure generally indicated by numeral 23. This structure or frame comprises side walls 23$^a$ and top and bottom 23$^b$, the tracker bar 24 extending across between the side walls. Secured to the outside of one side wall 23$^a$, is the motor supporting frame 24 provided with the curved plate 24$^a$ carried by arms 24$^b$, as clearly shown in Fig. 1. This curved plate 24$^a$ closely fits a portion of the outer periphery of my motor indicated by numeral 25 to which it is secured by screws, rivets, or the like. This motor comprises a cylindrical or plinth like casing 26 having one side thereof open and the other side closed and centrally sunk. Located in the inner periphery of this casing 26 are a plurality of actuating units 27 comprising bellows each having one wall 27$^a$ comparatively thick and fixed to the inner periphery of the casing by screws, glue or the like. These bellows are also formed with the wall 27$^b$, which is connected to the first named wall 27$^a$ by the pouch or diaphragm 27$^c$ of flexible materials so constructed as to maintain one pair of ends of the walls 27$^a$, 27$^b$ in close contact and to permit movement together and away of the opposite pair of ends as is ordinarily the case with bellows construction. The larger side wall 27$^a$ of each of the bellows is provided with the aperture 27$^d$ leading from one side thereof partially through the same and communicating with the interior of the bellows, as is clearly shown in Fig. 4, for example. Lugs 27$^e$ extend upwardly from one end of the wall 27$^b$ of each of the bellows and one end of each connecting rod 28 is pivotally mounted therebetween upon a pin 29, as is clearly shown in Figs. 2 and 4, for example. At their other ends these rods 28 are pivotally mounted between a pair of spaced collars 30 upon the pins 31, which also serve to hold the collars 30 in spaced relation. The rods 28 are flattened adjacent their pivoted ends, as clearly shown in Fig. 4. The collars 30 are rotatably mounted upon the crank 32, which has the shaft portions 32$^a$, 32$^b$ secured thereto. A rod 33 extends outwardly from the crank 32 opposite the spaced collars thereon, and a counter weight 34 is adjustably mounted thereon by set screw 34$^a$ or the like, to counter-balance the weight of the spaced collars 30 and allied structure, when rotating. One of the connecting rods 28 is preferably non-pivotally secured at one extremity to the collars 30, being pivoted at its other extremity to the bellows wall, as in the case of the remaining rods for a purpose to be hereinafter described. In the operation of my motor, air is exhausted from the bellows in succession to cause a successive collapse thereof about the inner periphery of the casing 26 and this collapsing will cause a pull to be exerted by the successive rods 28 upon the collars 30. Owing to the securing of said collars to one of the rods 28 indicated by numeral 28$^a$ in Fig. 2, rotation of the collars relative to the crank 32 is prevented and the successive pulls will operate to rotate the shafts 32$^a$, 32$^b$, as will be apparent. A beveled pinion 35 is mounted on the shaft 32$^a$ outwardly of the casing 26, which is centrally depressed, as indicated at 26$^a$, to provide a protected location for such pinion. This pinion drives a bevel gear 36, secured to shaft 37 which is journaled adjacent said gear 36 in the bearing 38, in turn secured to the central portion of casing 26.

It is necessary to provide for proper distribution of the negative pressure to the successively actuating bellows 27, and the following mechanism is provided for that purpose:—A plate or diaphragm 40 provided with a circular peripheral flange 40$^a$ fits into the casing 26, the flange 40$^a$ being adapted to be secured thereto by screws or the like. This plate 40 is centrally depressed, as indicated by numeral 40$^b$, (see Fig. 4), and radially extending dividing walls or partitions 40$^c$ extend from adjacent the central aperture 40$^d$ in the plate 40 to the flange 40$^a$ with which they may be constructed integral. The plate 40 is further provided with apertures 40$^e$ adapted to aline with passages 27$^d$ in the fixed walls 27$^a$ of the bellows, each of these apertures 40$^e$ being located between a pair of dividing walls or partitions 40$^c$. A packing ring 41, provided with the apertures 42 is inserted between the plate 40 and the fixed walls 27$^a$ of the bellows and this packing ring or strip 41 is adapted to fit around the inner periphery of the casing 26, as clearly shown in Fig. 4, the apertures 42 being adapted to aline with the openings 40$^e$ and passages 27$^d$ at the same time preventing leakage between the plate 40 and the bellows. I have shown the bellows 27 as having their fixed walls 27$^a$ connected or joined together to form an annulus, this construction being especially adapted to provide ease in assembling and disassembling the structure and increasing the strength and rigidity of the same. A sleeve 45 fits in the aperture 40$^d$ of the plate 40 and is arranged to extend outwardly therefrom. This sleeve 45 is provided with the aperture or slot 45$^a$ adjacent one end thereof and adjacent the other end thereof are provided a plurality of slots 45$^b$, each adapted to be located between the inner ends of a pair of partitions 40$^c$, as clearly shown in Fig. 6. A cover plate 47 fits on the open end of the casing 26, and a packing spider 48 fits between the same and the diaphragm 40, the spider 48 being constructed with the outer packing ring fitting between the cover 47 and the flange 40$^a$ and also with radial strips adapted to contact with the partitions 40$^c$ to prevent leakage between the same and the cover. Screws or the like may be provided to hold the spider, cover and diaphragm in close relation whereby a plurality of air passages will be provided between adjacent pairs of partition walls 40$^c$, each of these passages communicating at one end through an aperture 45$^b$ with the interior of the sleeve 45 and at the other end through the aperture 40$^e$ with the passage 27$^d$ of the bellows 27. Rotatably mounted in the sleeve 45 is a distributing valve 50 centrally bored, as indicated by numeral 50$^a$ and having the grooves 50$^b$, 50$^c$ between the ends thereof, and separated by the dividing wall 50$^d$. The grooves 50$^b$, 50$^c$, each intercept a portion of the periphery of the valve 50, equal in extent to the periphery of the sleeve 45 which includes three of the apertures 45$^b$. In other words, each of the grooves 50$^b$, 50$^c$ is adapted to communicate with three of the bellows through three of the apertures 45$^b$. It is to be noted here that I have shown my motor as comprising seven of these bellows, having found this number to be convenient and practical. I do not wish, however, to be restricted to this number since any other number may be selected, as desired, it being advisable to have an odd number to avoid dead-centering effect. A sleeve 50$^f$ extends partly into the bore 50$^a$, and a pin 50$^g$ extends thereacross. The shaft 32$^b$ is slotted at its end to fit over this pin, as is clearly shown in Fig. 4. A bearing strip or bridge 51 extends across the aperture 40$^d$ and is apertured to form a bearing for the shaft 32$^b$, as is shown in Fig. 4.

It will be apparent that when a negative pressure is applied to sleeve 45, after the valve 50 has been properly set, this partial vacuum or negative pressure will operate to exhaust successive of the bellows 27 and thereby rotate the shaft 32$^b$ and shaft 32$^a$. The former rotates the valve 50 and provides for the proper distribution of the negative pressure to the bellows. To provide admission of the air to the bellows when they are allowed to expand, I provide the aperture 50$^j$ in one end of the valve 50, communicating with the groove 50$^c$. This aperture 50$^j$ furnishes communication between the groove 50$^c$ and the interior of the casing 26 between diaphragm 40 and inclosed end of the said casing. To permit free flow of air thereinto, I provide an aperture through the periphery of the casing, as indicated in dotted lines by numeral 55 in Fig. 6. It will be clear from the above that as the bellows are expanded or permitted to expand, air may flow through aperture 55 into the casing and through aperture 50$^j$, groove 50$^c$ and corresponding apertures 45$^b$, it will be supplied to the respective bellows. Similarly, negative pressure in sleeve 45 communicates through apertures 45$^b$ therein through an aperture 50$^h$ in valve 50, with the groove 50$^b$; from thence the air will be exhausted from the respective bellows. After the proper position of the valve has been determined and the pin 50$^g$ has been located and placed, the valve will be easily placed in correct position when the device is being assembled. If it is desired to reverse the rotation of the motor, the valve 50 may be rotated 180° relative to shaft 32$^b$ and the valve action will be reversed, causing consequent reverse rotation of the motor.

Extending upwardly from the tube 21 is the elbow 75 clamped thereon and in communication with the same through the aperture 21$^a$. This elbow 75 is provided with the cross tube 76 extending therethrough and closed at one end by a plug 76$^a$. This tube 76 is provided with the aperture 76$^b$ in communication with the aperture 21$^a$ and opposite this aperture 76$^b$ is a slot or groove 76$^c$. It will be apparent that tube 76 by means of the apertures 76$^b$, 76$^c$, furnishes a communication between the aperture 21$^a$ and the upper portion of the elbow 75, in which is located the tube 77. A sliding plug 78 is mounted in the cross tube 76, adjacent the end of tube 76 opposite the plug 76$^a$. A bracket 79 is detachably secured to the tube 21, some distance away from the plug 78 and a spring 80 extends between and is secured to bracket 79 and plug 78. This spring serves normally to retain plug 78 in position free of the apertures 76$^b$, 76$^c$ and is of predetermined strength so that as the negative pressure or partial vacuum becomes excessive in the system, the plug 78 will be subjected thereto and will be drawn partially across the said apertures until such negative pressure balances the spring 80, whereupon the plug 78 will be held stationary so long as the pressure remains constant. The spring 80 having been properly selected and adjusted, the action of the plug will be to reduce the size of apertures 76$^b$, 76$^c$ for an increase in the negative pressure or partial vacuum so as to maintain approximately constant pressure in the tube 77. The upper end of the tube 77 is flanged, and secured thereto is the casing 81. This casing is chambered and is provided with the outwardly extending elbow 82 in communication with the interior thereof. A diaphragm 83 is carried in the casing 81 and this diaphragm is apertured as indicated by numeral 83ᵃ to furnish communication between the tube 77 and the interior of casing 81, this aperture 83ᵃ being of peculiar configuration, as will be explained later. A disk valve 85 rests upon and is adapted to rotate upon the diaphragm 83, this disk 85 having a segment thereof cut away, as indicated by numeral 85ᵃ, of a size commensurate with the extent of aperture 83ᵃ and plate 83, as shown in Fig. 11. A rod 86 is secured to the disk 85 and extends upwardly through the casing 81. Secured to the rod 86, upwardly of the casing 81 is the crank 87 which, at one end, is pivotally secured to a controlling rod 88, (see Fig. 5). At its opposite end the crank 87 is provided with the pins or studs 87ᵃ. The controlling rod 88 is pivotally connected to a pivotally mounted bell crank 89, which has its other arm pivotally connected to a second rod 90, which in turn is pivotally connected to one arm of another bell crank 91. A third rod 92 is pivotally mounted at one end to the other arm of bell crank 91 and at its other end the rod 92 is pivotally mounted to a controlling lever 93 having the engageable portion 93ᵃ and pivotally mounted at 93ᵇ. This engageable portion 93ᵃ is also adapted for use as an indicating member in coaction with the indicating dial 94, and it will be apparent that movement of this portion 93ᵃ of lever 93 will operate through the controlling rods and bell cranks to rotate the disk valve 85 in the desired direction to open or close the aperture 83ᵃ, the valve being shown in full open position in Fig. 11. The elbow 82 engages one end of a tube 95 which is provided with a circular cap portion 96 which fits over and communicates with the sleeve 45 through the aperture 45ᵃ therein.

It will be apparent, therefore, that through the tubes and conduits described above, the negative pressure from duct 21 may be transmitted to the sleeve 45 and from thence distributed to the bellows 27 to cause rotation of the shaft 32ᵃ and consequently the shaft 37, through the medium of beveled gears 35, 36. To regulate the speed of this motor, the lever 93 may be operated to rotate the disk valve 85 to cover or uncover, more or less, the aperture 83ᵃ thereby varying the amount of air drawn from the bellows 27 and operating to vary the speed of the motor. The indications on dial 94 will serve to gage the speed at which the motor is running to render selection thereof easy. The shaft 37 carries slidably mounted thereon, a pinion 100 formed with the grooved portion 101 having the groove 101ᵃ therein. This pinion 100 is mounted to rotate with the shaft 37 while capable of sliding thereon. The grooved portion 101 is provided on one face with the pin or spur 101ᵇ projecting outwardly therefrom. A roll driving shaft extends through one end wall 23ᵃ of the reel chamber and is adapted to rotate the collecting reel A. This shaft carries on the opposite side of the end wall 23ᵃ a gear 102 with which is adapted to mesh the pinion 100 when in the position shown in Fig. 2, for example. A forked arm 103 is secured on the reciprocable rod 104 and has its forked extremity fitting in the groove 101ᵃ of pinion 100. A sprocket wheel 105 is rotatably mounted upon shaft 37. A driving shaft 106 extends through the end wall 23ᵃ of the reel chamber and is adapted to detachably engage one end of music roll B, as shown in Fig. 2. Mounted upon this shaft 106, on the opposite side of the wall 23ᵃ is the sprocket 107 in alinement with loose sprocket 105 and a chain 108 extends around and between these sprockets.

When the piano is being played as is customary, the reel A is positively driven to draw the sheet of music from the reel B across the tracker bar 24 by means of the engagement of pinion 100 with gear 102. At the same time the sprocket 105 is running freely and only the movement of the sheet music serves to rotate the roll B which is consequently, in effect, running free. When it is desired to re-roll the music, however, the rod 104 may be operated to draw the pinion 100 out of engagement with the gear 102 and back until the pin 101ᵇ contacts with a pin 105ᵃ carried by and projecting outwardly from sprocket 105. In this position the pinion 100 is out of mesh with gear 102 and is positively driving the sprocket 105 and this will operate to positively drive the roll B in a direction reverse to the rotation of reel A when the music is being played. The rod 104 at its other end is secured to or formed integral with the elbow 104ᵃ which is slotted at 104ᵇ to permit reciprocation relative to the valve stem 86. The elbow 104ᵃ is also provided with the outwardly extending lugs 104ᶜ arranged for movement by the pins or studs 87ᵃ, the action being as follows:—

When the lever 93 is moved to starting position for playing, the corresponding pin 87ᵃ, through contact with the corresponding lug 104ᶜ will slide elbow 104ᵃ over to cause consequent meshing of pinion 100 and gear 102, causing rotation of the reel A. As it is desired to increase the speed of the music, the indicator 93ᵃ is moved in the direction of the arrow on indicator 94, thereby opening to a greater extent the aperture 83ᵃ in valve casing 81, causing, as explained above, an increase in the speed of the motor. When it is desired to re-roll the music, the indicator 93ª is pushed clear over to its limit of travel in the direction of the arrow and the corresponding pin 87ª will move the elbow 104ª in the opposite direction to that described above, whereupon the pinion 100 will be drawn out of mesh with gear 102 and the pins 101ᵇ, 105ª will contact so as to cause positive driving in a reverse direction of the roll B, as explained above, at the same time maintaining the disk valve 85 in full open position so that by means of the ratio of the sprockets 105, 107 and such full opening of the valve, the music may be rerolled at comparatively high speed. The driving shafts for the reel A and music roll B each have an extremity journaled in the bearing portions 110, 111, respectively, formed integral with the frame 24, as shown in Fig. 2 for example.

It is believed that the operation of my improved device will be sufficiently clear from the above to obviate necessity of further explanation.

It is to be noted that while I have shown and described my invention with more or less particularity, I do not wish to be restricted to such showing and description beyond the scope of the appended claims.

What I claim is:

1. In a device of the class described, a casing, a rotatable shaft journaled in said casing, a plurality of bellows located about said shaft, a dividing wall located in said casing, said dividing wall being constructed of a plurality of partitions, each of said bellows being provided with a passage communicating with the space between a pair of said partitions, said casing being provided with a valve chamber in communication with said space between each of said partitions, a distributing valve rotatably mounted in said casing, a negative pressure line communicating with said chamber, said valve being adapted to throw successive of said bellows in communication with said vacuum line to cause collapsing of the former and being arranged to permit a supply of air to said bellows not in communication with said negative pressure line.

2. In a device of the class described, a casing, a rotatable shaft journaled in said casing, said casing being provided with a valve chamber, a vacuum line in communication with said valve chamber, a plurality of bellows located in said casing about said shaft and operatively connected thereto, said bellows being mounted on an annular wall and said wall being provided with a plurality of ducts communicating with the interior of said bellows, ducts in said casing connecting said valve chamber with said passages, a valve operatively secured to said shaft and located in said valve chamber, said valve being provided with a groove adapted to communicate with a plurality of said bellows, a second groove also adapted to communicate with a plurality of said bellows, said first named groove being in communication with said vacuum line and said second named groove being in communication with the atmosphere, whereby when said device is operating said valve will operate to cause collapsing of successive of said bellows and permit expansion of other of said bellows to cause rotation of said shaft.

In testimony whereof, I have subscribed my name.

CHARLES FREBORG.

Witnesses:
WILLIAM W. HEHR,
FRANK O. SCHNEIDER.

Copies of this patent may be obtained for five cents each, by addressing the "Commissioner of Patents, Washington, D. C."